United States Patent
Focken et al.

(10) Patent No.: US 6,695,548 B2
(45) Date of Patent: Feb. 24, 2004

(54) SURFACE MILLING OR ANGULAR MILLING CUTTER

(75) Inventors: Andreas Focken, Schwarzenbek (DE); Klaus Oppelt, Lauenburg (DE)

(73) Assignee: Wilhelm Fette GmbH, Schwarzenbek (DE)

( * ) Notice: Subject to any disclaimer, the term of this patent is extended or adjusted under 35 U.S.C. 154(b) by 226 days.

(21) Appl. No.: 09/764,181

(22) Filed: Jan. 17, 2001

(65) Prior Publication Data

US 2001/0051075 A1 Dec. 13, 2001

(30) Foreign Application Priority Data

Mar. 16, 2000 (DE) .......................... 100 12 818

(51) Int. Cl.[7] .............. B23C 5/00; B23C 5/20
(52) U.S. Cl. .............. 407/34; 407/38; 407/43; 407/44
(58) Field of Search .............. 407/34, 35, 36, 407/38, 39, 40, 43, 46, 53, 58; 408/147, 153, 154, 156, 158

(56) References Cited

U.S. PATENT DOCUMENTS

| | | | | |
|---|---|---|---|---|
| 1,146,546 A | * | 7/1915 | Amborn | 407/10 |
| 4,318,647 A | * | 3/1982 | Erkfritz | 407/45 |
| 4,623,284 A | * | 11/1986 | Greiff | 407/38 |
| 4,627,771 A | * | 12/1986 | Kieninger | 407/39 |
| 4,692,069 A | * | 9/1987 | Kieninger | 407/39 |
| 4,848,977 A | * | 7/1989 | Kieninger | 407/39 |
| 5,391,023 A | * | 2/1995 | Basteck | 408/146 |
| 2002/0081168 A1 | * | 6/2002 | Kress | 408/179 |

FOREIGN PATENT DOCUMENTS

DE    197 06 377    1/1998

* cited by examiner

*Primary Examiner*—Henry W. H. Tsai
(74) *Attorney, Agent, or Firm*—Vidas, Arrett & Steinkraus P.A.

(57) ABSTRACT

A surface milling or angular milling cutter, comprising a carrier body which circumferentially, at uniformly or non-uniformly spread spacings, has disposed pockets which extend in parallel with the axis of rotation of the carrier body for the accommodation of cassettes which, in turn, have seating surfaces for the accommodation of tool tips, a mounting device for the tool tips in the cassette, a bolt mounting to locate the cassettes in the pockets, and an adjusting pin for each cassette for a limited axial displacement of the cassettes in two directions in the pockets, characterized in that the radially outer portion of the cassette is divided by a gap extending approximately in the radial plane, and the gap receives a setting wedge the position of which can be adjusted by means of an adjusting screw in the gap.

6 Claims, 2 Drawing Sheets

SURFACE MILLING OR ANGULAR MILLING CUTTER

CROSS-REFERENCE TO RELATED APPLICATIONS

Not Applicable

STATEMENT REGARDING FEDERALLY SPONSORED RESEARCH

Not Applicable

BACKGROUND OF THE INVENTION

This invention relates to a surface milling or angular milling cutter.

DE 197 06 377 has made known a surface milling or angular milling cutter wherein a carrier body circumferentially has disposed pockets which extend in parallel with the axis of rotation of the carrier body and serve for the accommodation of cassettes. The cassettes, in turn, exhibit seating surfaces for the accommodation of tool tips. The tool tips are mounted in the cassette by means of a suitable fixing device, e.g. by means of bolts which are passed through a through bore of the tool tips. The cassettes, in turn, are adapted to be mounted in the pockets, e.g. also by means of a bolt which interacts with a threaded bore in the bottom of the pocket. In the known tool, means are further provided to axially adjust the cassette in order that sufficient planarity is obtained for the entirety of the tool tips. In an embodiment, a single adjusting bolt is provided for each cassette which is seated in a threaded bore of the carrier body which extends, starting from the front-end face of the carrier body, approximately in parallel with the axis of rotation of the carrier body. For example, the adjusting bolt has a head which interacts with a matching recess of the cassette. Thus, the cassette may actively be set in a precise way in the two axial directions. Rough setting is performed by the mounting of the cassette in the pocket. Therefore, precise setting can only be effected within the range of the cassette mounting tolerance.

In another embodiment of the known surface milling and angular milling cutter, it is known to accommodate the cassettes in the pockets in a snug fit and to provide the carrier body with a radial stop surface directed to the free front-end face of the carrier body to enable the cassettes to abut thereon. Then, the cassettes may be caused to abut on the stop surface by means of the adjusting pin.

Even following such adjustment, undesirable deviations of the position of the cutting inserts may still occur on the surface milling and angular milling cutter, especially by the fact that the cassettes are finally tightened. The cutting inserts frequently consist of a hard material or are coated with a hard material or diamond, which cutting material reacts very sensitively to excessively strong stresses which unquestionably occur if the cutting inserts deviate from the surface plane.

Therefore, the object of the invention is to provide a surface milling or angular milling cutter by which highly precise surfaces may be shaped on the workpiece.

BRIEF SUMMARY OF THE INVENTION

In the invention, the cassette has included, in a radially outwardly disposed portion, a gap extending approximately in the radial plane of the carrier body which thus divides the radially outward portion of the cassette into two axially spaced-apart subportions. The gap receives a setting wedge which is adapted to be radially displaced by means of an adjusting screw in the gap. If a maladjustment is found to exist after the final tightening of the cassette, which has been preceded already by an adjustment of the cassette in the pocket, either by means of the adjusting screw which is axially displaceable in the two directions or by causing the cassette to abut on a stop surface, re-adjustment can be made by means of the setting wedge.

The displacement of the setting wedge in the gap is preferably performed by means of a bolt which is passed through a through bore of the wedge and interacts with a threaded bore in the bottom of the gap. The gap may also wedge-shaped here.

Since a certain volume of material is necessary for the wedge to enable a through bore for the adjusting screw and provide stability one aspect of the invention provides that a groove which receives a complementary rib of the wedge is formed in one wall of the gap, preferably the one which faces away from the cutting insert. The groove and the wedge preferably are semicircular in cross-section. Then, the through bore may be passed, in part, through the rib of the wedge. Thus, sufficient material may be maintained between the seating surfaces for the cutting insert and the gap. This is particular important if the cutting insert is mounted in the cassette by means of an approximately central bolt.

Since the cutting insert normally is not mounted centrally with regard to the longitudinal axis of the cassette it is advantageous, according to another aspect of the invention, if the wedge, which is of the width of the cutting insert at the most, is disposed in a relationship directly facing the cutting insert in the gap. This enables the wedge to efficiently transmit the axial force exerted onto the cutting insert.

The invention will now be explained in greater detail with reference to an embodiment shown in the drawings.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
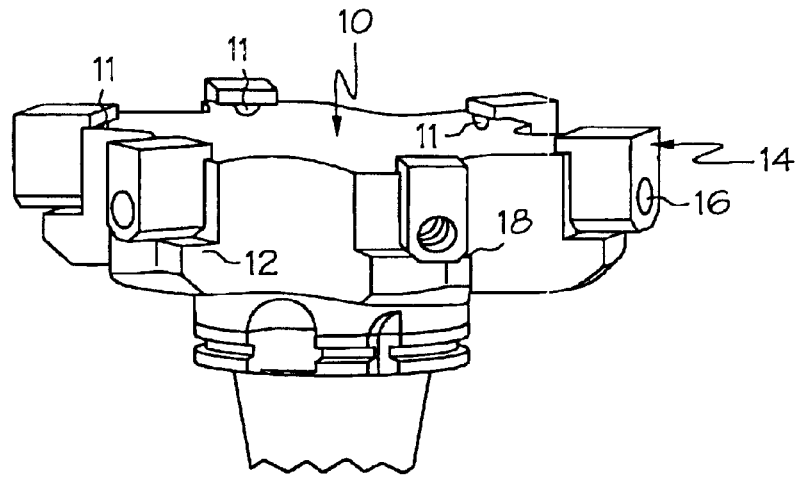
FIG. 1 shows a perspective schematic view of a surface milling cutter according to the invention with the cassettes shown as uncompleted components.
Figure 2:
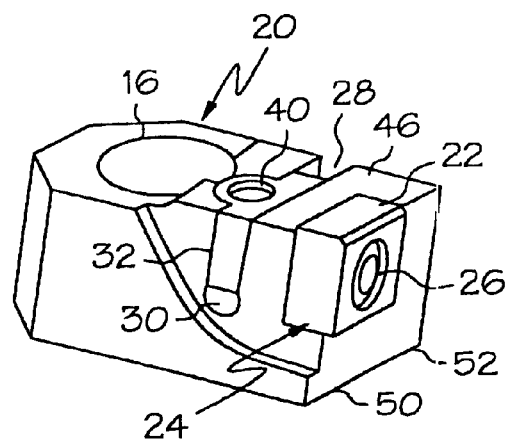
FIG. 2 shows the completed cassette of the milling cutter of FIG. 1.
Figure 3:
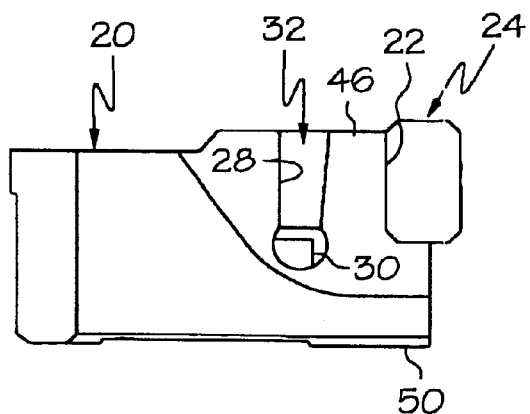
FIG. 3 shows a side view of the cassette of FIG. 2.
Figure 4:
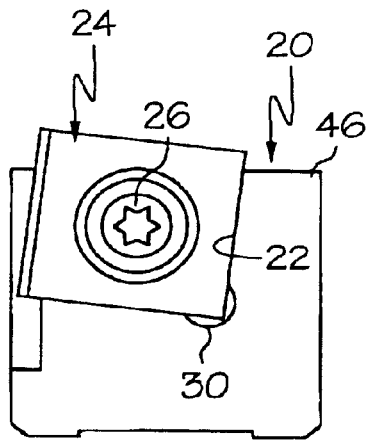
FIG. 4 shows a front view of the cassette of FIG. 2.

Referring to FIG. 1, a carrier body 10 is outlined which circumferentially has a series of axially extending pockets 12. The pockets accommodate cassettes 14 which are drawn as uncompleted components here. They already have a through bore 16 in order that they may be located by means of a bolt (not shown) in the pocket. The milling cutter shown in FIG. 1 may be reproduced from a known surface milling cutter as has been disclosed already in the previously mentioned DE 197 06 377. Possible ways are also suggested there how to axially adjust the cassettes 14, e.g. by means of a bolt screwed into the front-end face of the carrier body 10 the head of which interacts with the cassette 14 in order to precisely adjust the cassette after it is tightened first by the cassette mounting bolt. As an alternative, it is also possible to allow the cassette 16 to interact with a stop surface 18 in the pocket 12. In this case however, it will be necessary for the cassette to be seated in the pocket in a snug fit. During the latter adjustment, the cassette is abutted against the stop surface 18. The completed cassette is shown in FIGS. 2 through 6. It is indicated by 20 there. Therefore, reference is made to FIGS. 2 through 6 in the following.

At its axial end, the cassette 20, in turn, has a pocket 22 in which seating surfaces are formed to receive a cutting insert 24 which can be firmly located by means of a screw 26 on the cassette 20. The screw extends through a central through bore of the cutting insert 24. A mounting of this type is known as such.

A wedge-shaped gap 28 is continuously formed between the pocket 22 and the through bore 16 of the cassette in the upper region of the cassette 20. The gap extends transversely to the longitudinal axis of the cassette 20 and ends in a groove 30 of a circular section the function of which is to avoid notch effects. The gap 28 receives a setting wedge 32 the shape of which is approximately complementary to the cross-sectional contour of the gap 28 and which has included at its outside a rib 36 of a semicircular cross-section, which interacts with a complementary groove 38 in the wall of the gap 28 which faces away from the cutting insert 24. The wedge 32 is radially traversed by a through bore 40 which receives a bolt 42 (FIG. 5) which interacts with a threaded bore 44 (FIG. 6) in the bottom of the gap 28. The bolt 42 may be used for varying the position of the wedge 32 in the gap 28 to a limited degree. As a result, a more or less intense deflection occurs on that portion 46 of the cassette 20 which holds the cutting insert 24. Thus, it is possible to adjust the position of the cutting edge of the cutting insert 24. Such adjustment may be made after the cassette is firmly mounted in the carrier 10 after it is adjusted before by means of the adjusting screw which is passed through the bore 16.

Only for completeness, it is noted that the cassette has included on the underside supporting surfaces 50, 52 for a precise rest in the pocket 12 of the carrier 10.

Figure 5:
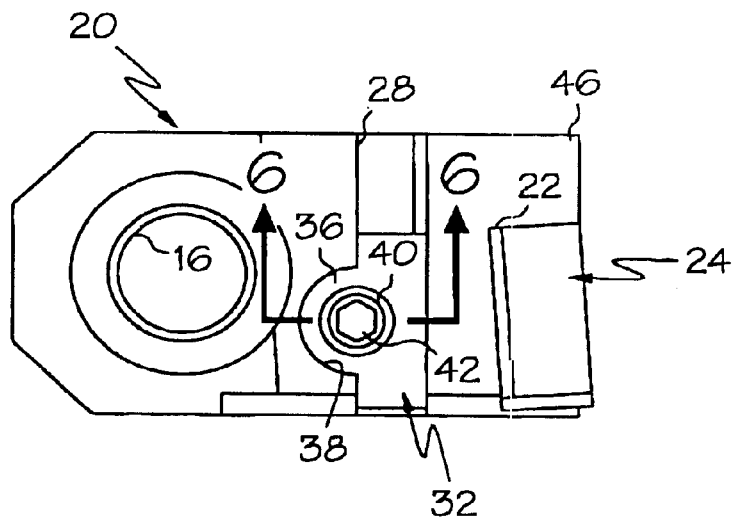
FIG. 5 shows a plan view of the cassette of FIG. 2.
Figure 6:
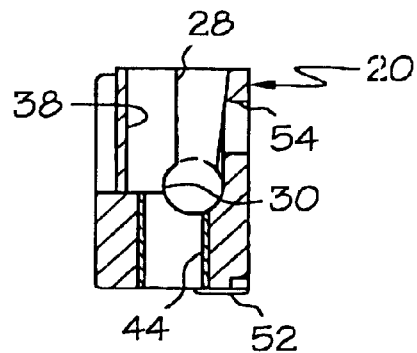
FIG. 6 shows a section through the illustration of FIG. 5 along lines 6—6.

As can be seen from FIG. 5 the width of the wedge 32 is somewhat smaller than the one of the cutting insert 24 with the cutting insert 24 and the wedge 32 being directed to each other in an axial direction to enable the wedge 32 to fully receive the axial load. Referring to FIG. 6, for the rest, the threaded bore 54 can be seen into which the bolt 26 is screwed for mounting the cutting insert 24.

The means to adjust the cassette 20 in the pocket 18 in an axially parallel direction by means of a pin, a screw or the like as have become known, for example, from DE 197 06 377 are shown at reference 11 in FIG. 1.

These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. A surface milling or angular milling cutter, comprising a carrier body which circumferentially, at uniformly or non-uniformly spread spacings, has disposed pockets which extend in parallel with the axis of rotation of the carrier body for the accommodation of cassettes which, in turn, have seating surfaces for the accommodation of tool tips, a mounting device for the tool tips in the cassette, each cassette being attached in the pocket with a mounting bolt, and an adjusting pin for each cassette for a limited axial displacement of the cassettes in two directions in the pockets, characterized in that a radially outer portion of the cassette is divided by a gap extending approximately in a radial plane, and the gap receives a setting wedge the position of which can be adjusted by means of an adjusting screw in the gap.

2. The milling cutter according to claim 1, characterized in that the bottom of the gap has formed therein a threaded bore for the adjusting screw, which bore extends through a radial through bore of the wedge.

3. The milling cutter according to claim 1, characterized in that the gap is wedge-shaped.

4. The milling cutter according to claim 2, characterized in that a wall of the gap has formed therein a groove of a semicircular cross-section which receives a complementary rib of the wedge and that the through bore is passed, in part, through the rib.

5. The milling cutter according to claim 1, characterized in that the seating surfaces in the cassette are configured so that the cutting insert is offset to one side from the longitudinal axis of the cassette, the width of the wedge approximately corresponds to the width of the cutting insert, and the wedge is disposed approximately centrally with regard to the cutting insert in the gap.

6. The milling cutter according to claim 3, characterized in that a wall of the gap has formed therein a groove of a semicircular cross-section which receives a complementary rib of the wedge and that the through bore is passed, in part, through the rib.

* * * * *